United States Patent [19]

Notarianni

[11] Patent Number: 5,404,511
[45] Date of Patent: Apr. 4, 1995

[54] COMPACT DISC PLAYER WITH FRAGMENT MEMORY MANAGEMENT

[75] Inventor: Benedetto A. Notarianni, Reigate, England

[73] Assignee: U.S. Philips Corporation, New York, N.Y.

[21] Appl. No.: 904,771

[22] Filed: Jun. 26, 1992

[51] Int. Cl.$^6$ .............................................. G06F 15/20
[52] U.S. Cl. ...................................... 395/600; 369/32; 369/47
[58] Field of Search ............... 395/425, 600, 325, 164; 369/32, 47, 33, 30, 25, 14

[56] References Cited

U.S. PATENT DOCUMENTS

| 4,912,629 | 3/1990 | Shuler | 395/600 |
| 5,109,336 | 4/1992 | Guenther | 395/425 |
| 5,148,527 | 9/1992 | Basso | 395/425 |

OTHER PUBLICATIONS

Wilson, "Uniprocessor Garbage Collection Techniques", Proceedings: Memory Management. International Workshop IWMM 92, pp. 1–42 (Springer Verlag Sep. 23, 1992).
Edited by Philips International & published by Kluwer Technical Books, ISBN 90 201-21103, entitled: "CD-I: A Designer's Overview", Chapter 7 1987.
P. Dibble, "OS-9 Insights: An Advanced Programmers Guide to OS-9/68000", Chapters 3 & 4, published by Microwave Systems Corporation, ISBN 0-9180-35-0105 1991.

*Primary Examiner*—Thomas G. Black
*Assistant Examiner*—Jennifer M. Orzech
*Attorney, Agent, or Firm*—Anne E. Barschall

[57] ABSTRACT

An application module of a data processing apparatus requires various quantities of memory space for the buffering of data to be processed. In particular, image and audio files are to be read from a CD-ROM disc and decoded in real-time. The operating system provides a memory manager to allocate buffer space from the available memory. To alleviate the problem of fragmentation, a fragmented memory manager module secures at the outset an allocation of buffer space sufficient for all requirements of the application module, and partitions the allocation into small units of buffer space (fragments), which are linked into a list by respective list pointers. Any subsequent requirement for buffer space is met by the fragmented memory manager, by un-linking the requisite number of fragments from the list of unallocated fragments. The application module is adapted to use fragmented buffer space where possible, while the allocation of buffer space in contiguous blocks is not excluded when necessary.

3 Claims, 7 Drawing Sheets

COMPACT DISC PLAYER WITH FRAGMENT MEMORY MANAGEMENT

The invention relates to dynamic allocation of buffer space in the memory of a data processing apparatus. The invention has particular utility in so-called interactive systems, where audio, video and other data items are to be decoded and presented to a user in real-time.

In many data processing apparatuses, data is read from a database stored in some form of mass memory (for example a magnetic disc or Compact Disc read-only memory (CD-ROM) and transferred to local memory (RAM) for processing. Local memory is limited, however, and it is generally unpredictable what items of data need to be loaded at any given time, and what is the size of each. Therefore it is necessary to provide some memory management function, which keeps track of the available memory and allocates buffer space in response to requests from application processes.

The Compact Disc-Interactive (CD-I) player, available from Philips, is an example of a data processing apparatus in which memory management functions are provided by a real-time operating system CDRTOS. CDRTOS is based on another real-time operating system OS-9/68000. The CD-I player operates under the control of an application program which is loaded from a CD-ROM. Through some play control functions of CDRTOS, the application program can control access to a large database of images, sounds and other information stored on the CD-ROM, under the interactive control of the user.

A description of the CD-I player is provided in "CD-I: A Designer's Overview", edited by Philips International and published by Kluwer Technical Books, ISBN 90-201-21103. This book is incorporated herein by reference. The problems of memory management in such systems are described for example in Chapter 3 and 4 of the book "OS-9 INSIGHTS: An Advanced Programmers Guide to OS-9/68000" by Peter Dibble, published by Microware Systems Corporation, ISBN 0-918035-0105.

One particular problem highlighted in the Dibble book is that of memory fragmentation. This occurs when, after a period of operation during which various parts of the memory have been allocated and de-allocated, the available (unallocated) memory at a given time is made up of small areas dispersed effectively at random throughout the memory space. This fragmentation might mean, for example, that a request for the allocation of 60 kilobytes of buffer space cannot be satisfied because there is no single unallocated block larger than 50 kilobytes. At the same time, adding up all the small fragments, there may in fact be hundreds of kilobytes of unallocated memory.

The invention addresses the problem of providing memory management in a data processing apparatus, for example to reduce the problem of fragmentation described above.

The invention provides a method of dynamically allocating and releasing variable quantities of buffer space in a memory of a data processing apparatus having a finite total amount of buffer space, the method comprising:

(a) in an initialization step (i) partitioning the total unallocated buffer space into a set of small buffer fragments, maintaining for each unallocated fragment a respective list pointer; and (ii) constructing and maintaining by means of said list pointers a linked list of unallocated fragments (the "free list");

(b) in response to each subsequent request for allocation of a quantity buffer space, un-linking from the free list a list (the "allocated list") of fragments sufficient in number to contain the requested quantity of buffer space; and (c) in response to a subsequent request for release of the allocated list of fragments re-linking the allocated list of buffer fragments into the free list.

By managing the memory from the outset as a set of many small fragments, any small fragment can be utilised to contribute to any allocation of buffer space, large or small (minimum size: one fragment). Of course the allocated buffer may be the sum of many fragments dispersed randomly throughout the physical memory space. This need not be a problem, however, because the list pointers can be used by the apparatus in accessing the allocated buffer space. It will be appreciated that fragmentation no longer prevents allocation of a requested quantity of buffer space.

In the CD-I apparatus, the CDRTOS play control function is already capable of using fragmented memory as buffer space by means of its play control structure. The invention is particularly valuable in such a case.

Accordingly, a particular embodiment of the invention provides a real-time data processing apparatus comprising:

a database access means ("reader") for receiving from a database data for processing in real-time;

real-time data processing means ("decoder") for processing the data received from the database;

memory means coupled between the reader and the decoder for providing buffer space for storing the received data prior to processing by the decoder;

an application module for generating play commands to control the reader and decoder to process data in a desired sequence; and a play control module for receiving said commands and for controlling the reader and decoder in real time so as to receive data from the database and cause processing of said data in a real-time sequence defined by said commands, wherein each play command supplied to the play control module includes (i) file information defining the location in the database of the data to be processed and (ii) buffer information specifying the location in the memory of buffer space for storing said data, wherein the buffer information comprises at least one play control item containing fields for indicating the location of a first quantity of buffer space and a list pointer to an optional further play control item, wherein the play control module is responsive to said play command to cause the data defined by the file information to be received from the database and stored in said first quantity of buffer space and in the event that said first quantity of buffer space becomes full to use the list pointer in the at least one play control item to identify a further play control item indicating a further quantity of buffer space for storage of the required data, and wherein the total of available buffer space in the memory is divided into a plurality of fragments, each fragment containing a relatively small predetermined quantity of available buffer space and having an associated play control item with a list pointer identifying a further fragment containing available buffer space, the apparatus yet further comprising a fragmented memory manager module for maintaining by means of the play control item list pointers a list of those of said fragments whose buffer space is not currently in use by the play control module (the "free list") and for responding to each request for allocation of buffer space by un-linking from the free list a list of fragments (the "allocated list") and supplying to the application module a pointer to the allocated list for use by the play control module in identifying buffer fragments for received data.

In the case of CD-I, each fragment may conveniently contain enough buffer space for one sector of data from the CD-ROM, that is 2324 bytes. The memory consumed by storing so many list pointers will be only one percent or so of the total memory space, which is trivial compared to the amount of memory that can be wasted by fragmentation in a conventional memory management system.

To illustrate the above and further features and advantages of the invention, embodiments of the invention will now be described, by way of example, with reference to the accompanying drawings, in which.

Figure 6:
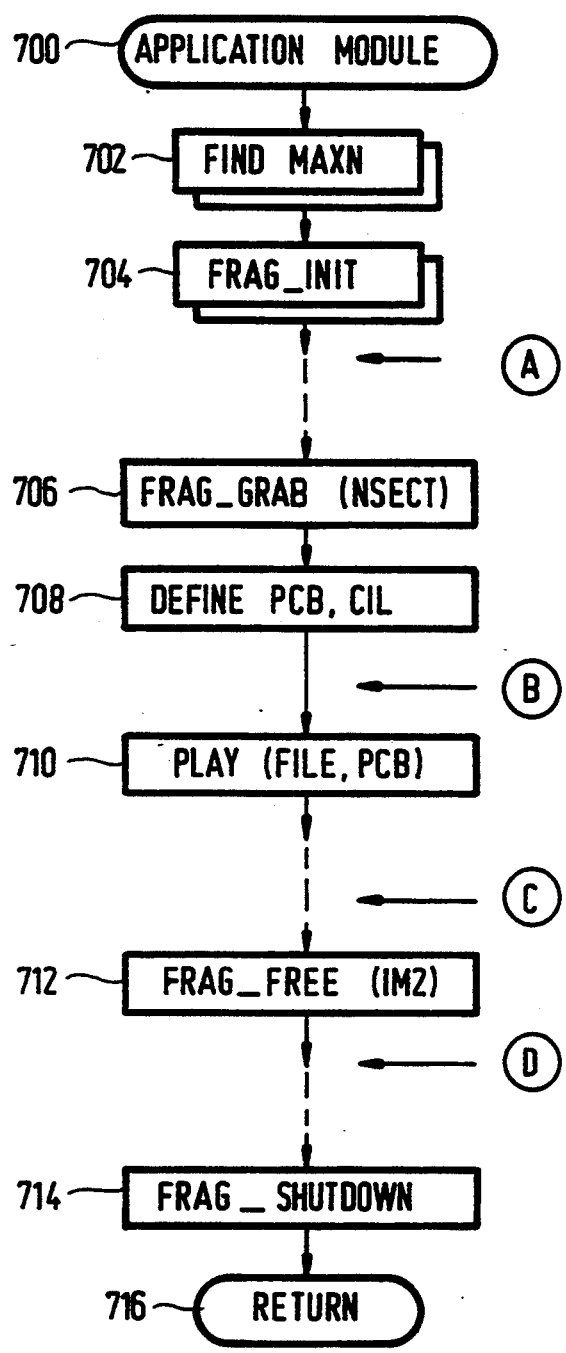
FIG. 6 is a flow chart representing the operation of an application module of the apparatus.
Figure 7:
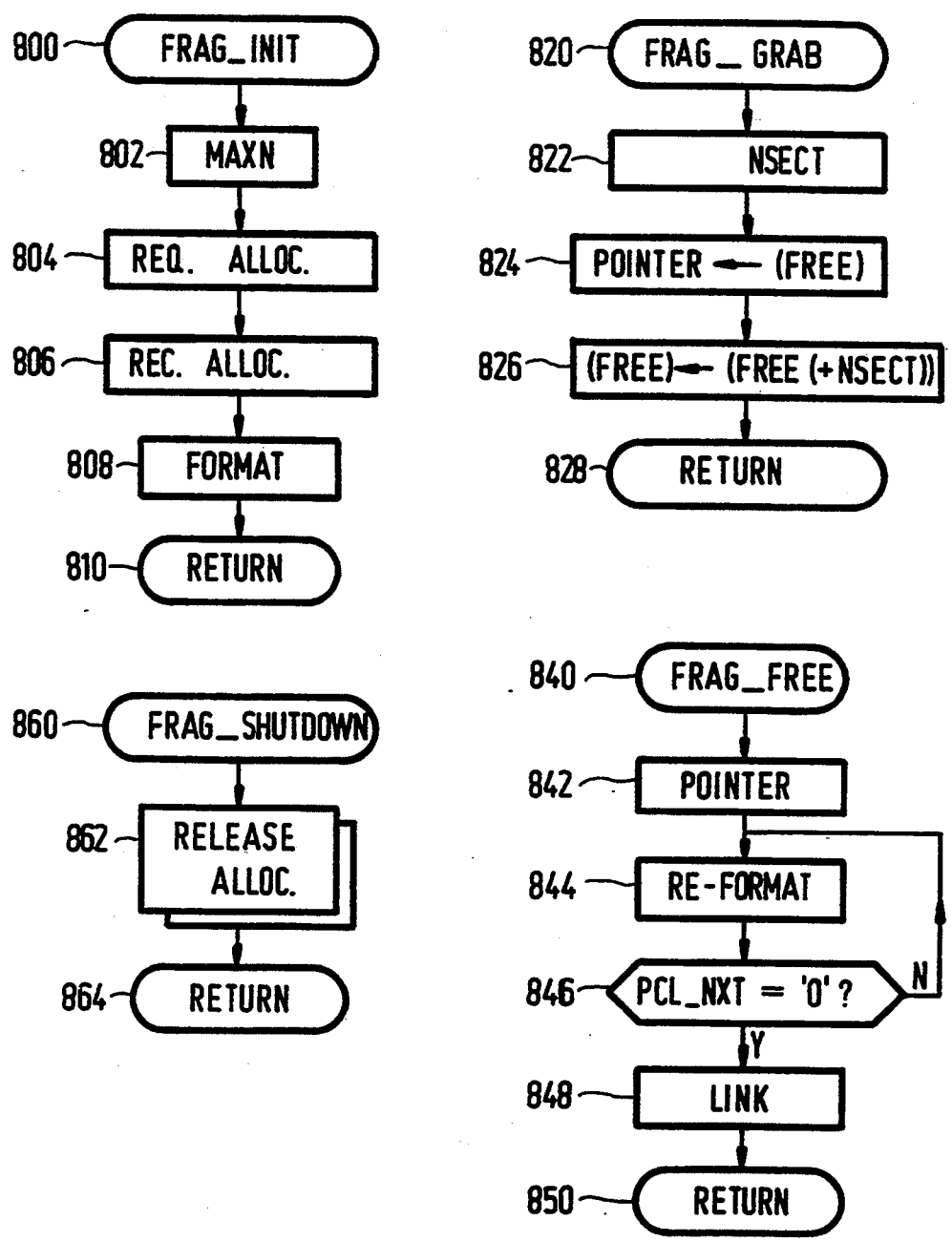
Figure 8:
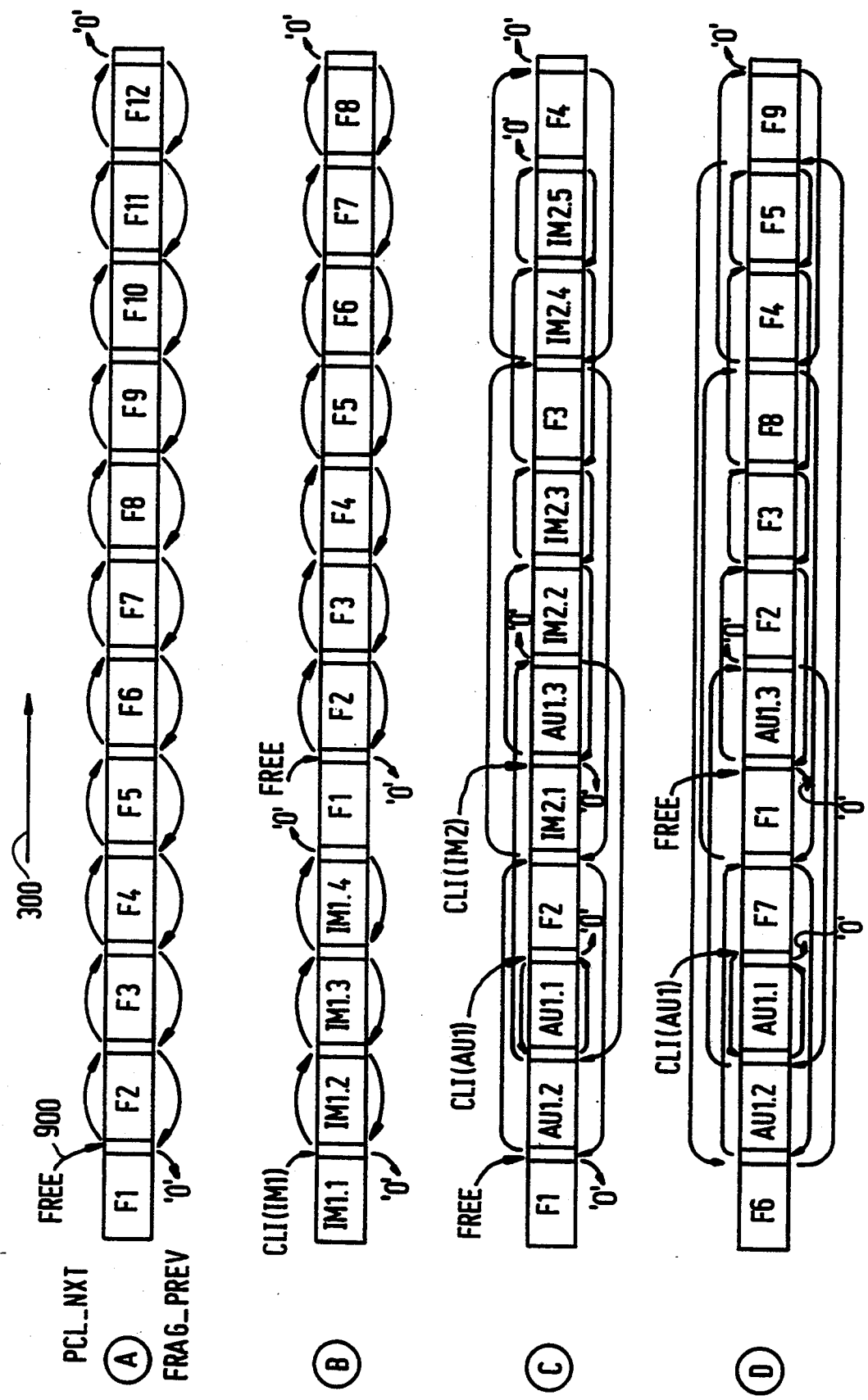
Figure 9:
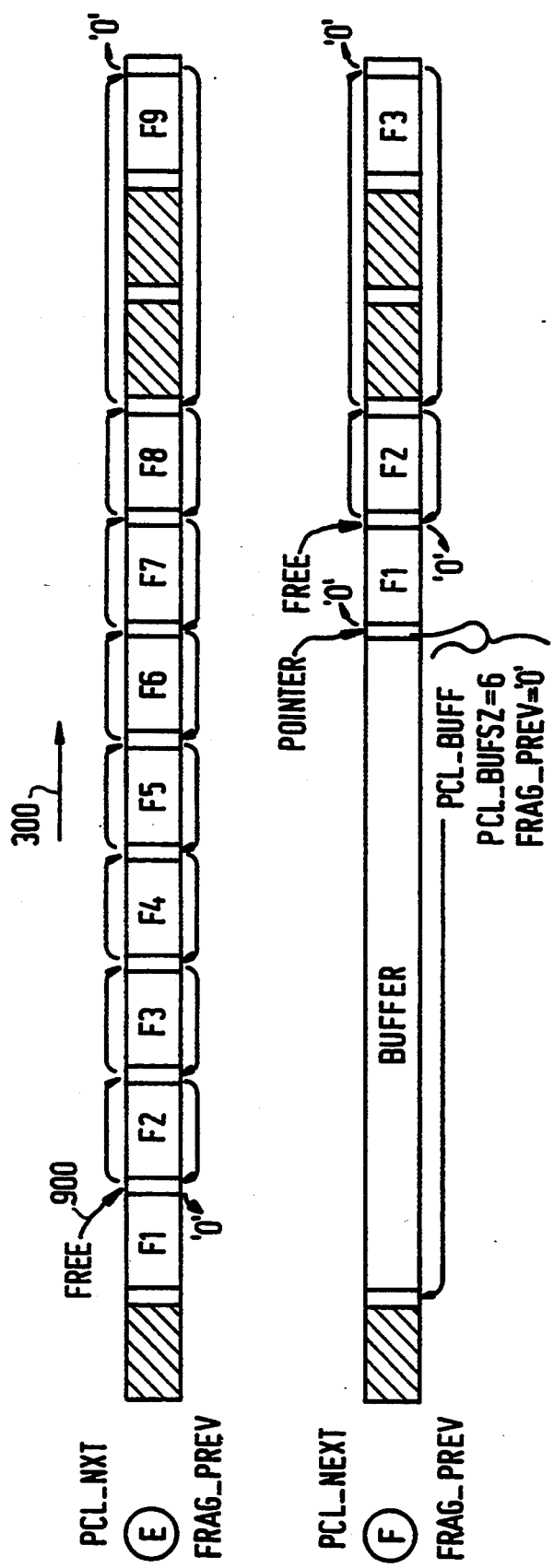

FIG. 7 comprises four flow charts representing the operation of elements of the fragmented memory manager of FIG. 6;

FIG. 8 illustrates the allocation of memory fragments at points (A), (B), (C) and (D) in the flow chart of FIG. 7; and FIG. 9 illustrates the allocation of contiguous blocks of memory within the fragmented memory of the apparatus.

Figure 1:
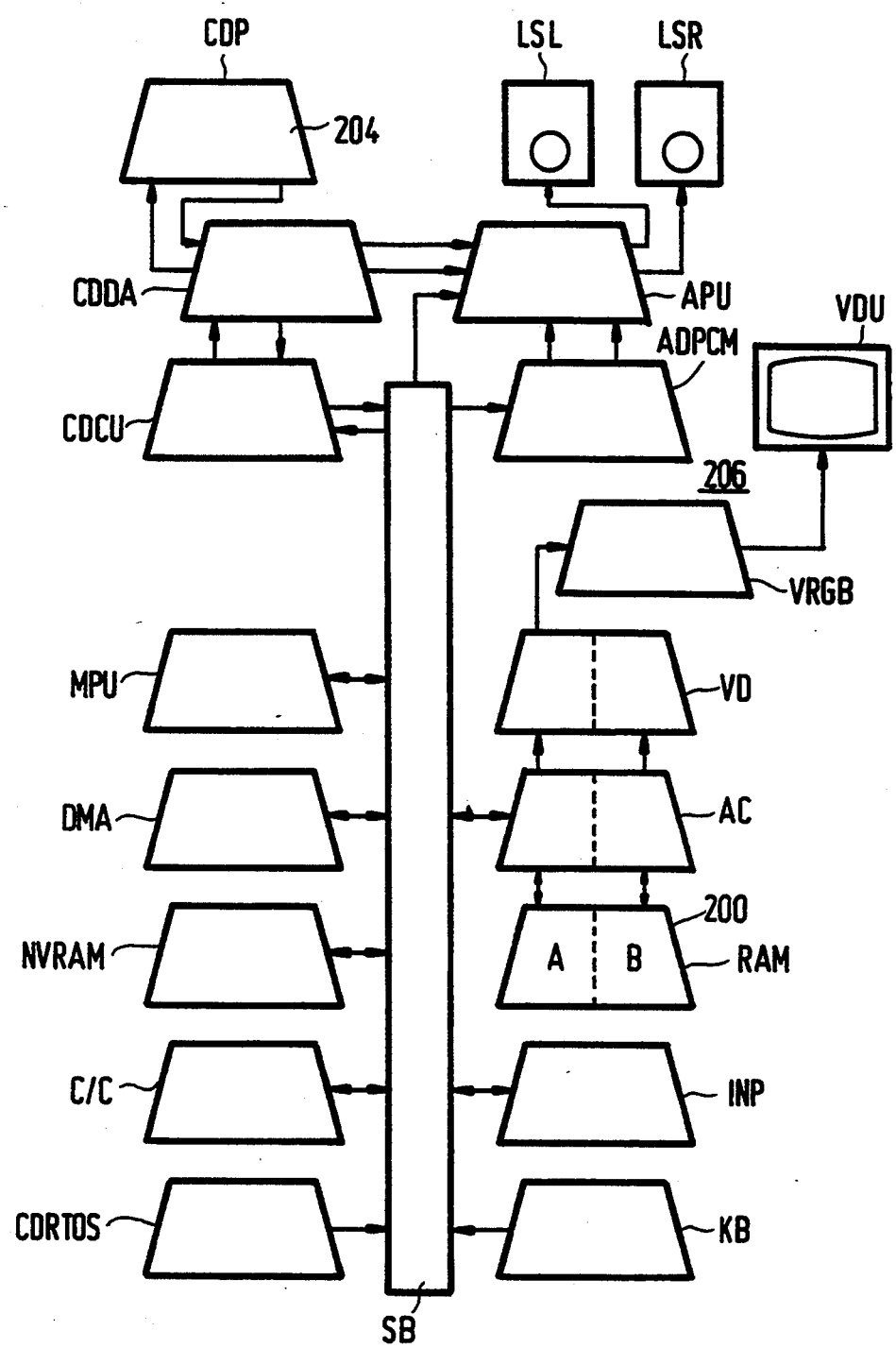
FIG. 1 shows the hardware structure of the data processing apparatus suitable for implementing the invention, in the particular form of a CD-I player.

FIG. 1 is a block schematic diagram of the Compact Disc-Interactive (CD-I) player. It comprises a compact disc player CDP to which is connected a compact disc digital audio controller decoder CDDA and a compact disc control unit CDCU. The CDDA is connected to an audio processing unit APU which feeds two loudspeakers LSL and LSR. The CD control unit CDCU is connected to a system bus SB along which various digital signals are passed. Also connected to the system bus SB are a microprocessor unit MPU, a DMA controller DMA, a non-volatile random access memory NVRAM, a clock calendar unit C/C, a read-only memory containing the real-time operating system CD RTOS, a keyboard KB, a pointing device INP, and an access controller AC. The access controller controls the reading from and writing to a random access memory RAM which is split into two banks A and B. The access controller is also connected to a video decoder VD which in turn feeds a video generator VRGB, the output of which is connected to a video display unit VDU. Also connected to the system bus SB is an adaptive pulse code modulation decoder ADPCM which feeds the audio processing unit APU. A description of the CD-I base case decoder as shown in FIG. 1 is given in the book "Compact Disc-Interactive, A Designer's Overview" mentioned above.

In the CD-I player, the operating system CDRTOS controls the operation of the various hardware elements in real-time, under the control of application programs loaded from the disc. The processing power of microprocessor MPU is thus shared by application software modules and modules of CDRTOS, but in an asynchronous manner such that each module can be regarded as an independent functional module of the player.

Figure 2:
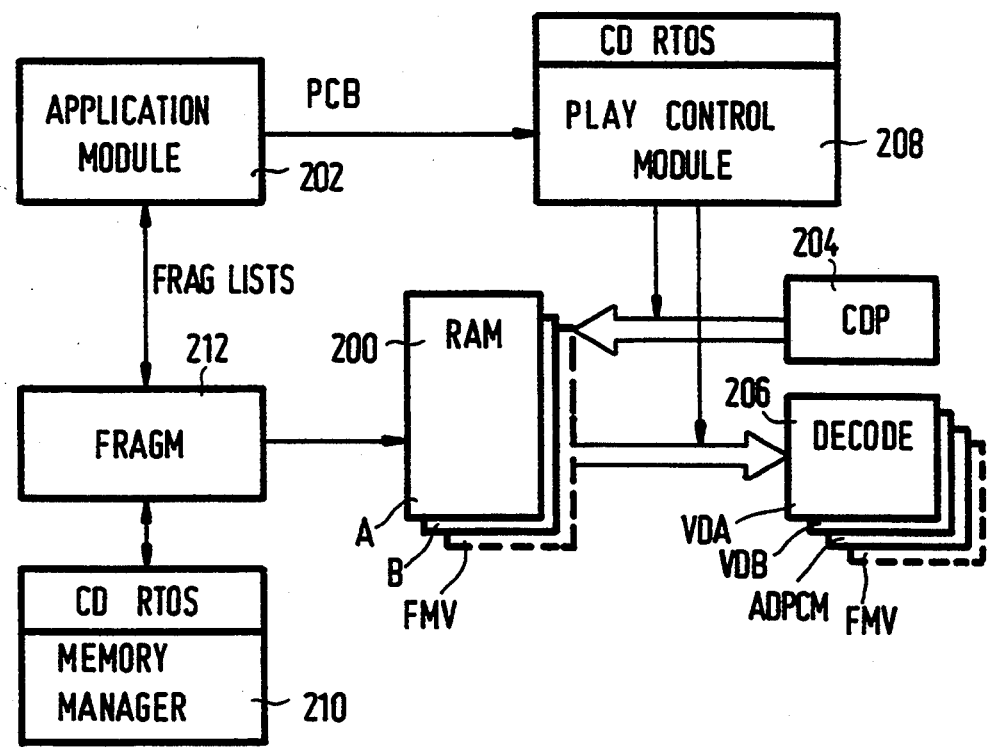
FIG. 2 shows the logical structure of the apparatus of FIG. 1, operating in accordance with the invention.

FIG. 2 illustrates the interaction of various modules in the CD-I player when implementing the present invention. Central to these functions is the memory (RAM) 200. This comprises one megabyte ($1024 \times 1024 \times 8$ bits) of read-write memory, divided into two planes A and B. A third plane FMV is shown dotted, which in future CD-I players will provide storage for full motion video data.

An application module 202, defined by program data read from the disc player 204 (CDP), operates with assistance from CDRTOS to read audio, video and program data from the disc into memory, and to cause the decoders 206 to read this data for the generation of desired audio and video presentations. Specifically, video decoders VDA and VDB receive data from respective planes A and B of the memory, while the audio decoder ADPCM can receive data from either plane.

A primary function of CDRTOS is the so-called playing of "real time files". Such files can contain audio data, video data or an interleaved mixture of the two, as described in the Philips/Kluwer textbook. A play control module 208 of CDRTOS receives instructions in the form of a file reference and play control information an proceeds to cause the reading, storing and decoding of the data without further effort on the part of the application module 202. A memory manager module 210 of CDRTOS allows the application module 202 to reserve blocks of memory in a desired plane of the memory 200, which can be used as buffers storing the video/audio data for a given play operation.

The elements of FIG. 2 as described so far are conventional. In a conventional arrangement, as the application module progresses in its operation, controlled by interaction with the user of the CD-I player, the problem of "memory fragmentation" arises.

Figure 3:
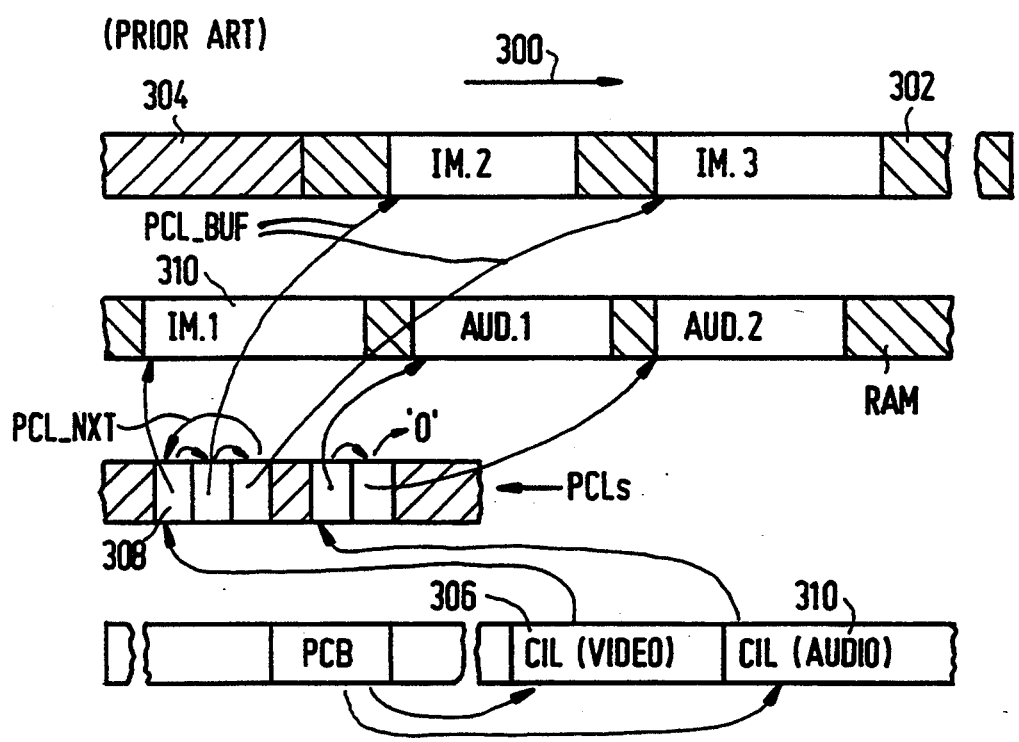
FIG. 3 illustrates the problem of memory fragmentation as it arises in the real-time control of the CD-I player with conventional memory management.

FIG. 3 illustrates the problem of fragmentation in the playing of real-time files in a CD-I player, according to conventional practice. Sections of one plane of RAM are shown, with an arrow 300 indicating the direction of increasing memory address. Parts of the address space which are free (not allocated by CDRTOS memory manager) are indicated by cross-hatching (302 etc.). Parts presently allocated for unspecified purposes are shown by simple hatching (304). Other blocks containing buffer spaces IM.1, IM.2, IM.3, AUD.1 and AUD.2 have been allocated as buffer areas for the purpose of storing video and audio data read from the disc.

A play control structure is also constructed in memory by the application module 202. This comprises a Play Control Block (PCB), a Channel Index List (CIL) for video, a CIL for audio and a set of Play Control List items (PCLs). The application module 202 supplies the play control module 208 of CDRTOS with one or more file references (pointers to data locations on the disc 24), and a pointer to the PCB. From then on the reading, storage and decoding of the files is automatic, barring intervention by the application module.

The PCB area contains various control and status fields, including channel identifiers and pointers to the two CILs. By changing the channel number, the particular audio and/or video data read from the disc can be selected to account for the language preference of the user, as described in the Philips/Kluwer textbook. For a given channel, each CIL has a pointer to a PCL item, as shown. The PCL structure in particular is relevant to an understanding of the present embodiment, and will now be described.

Each PCL item points to an area of memory which is to be used as a buffer, and contains the following fields:

PCL_CTRL: This field is initialized to zero by the application module before the play command is issued. It contains status flags for use by CDRTOS, in particular to note when an error occurs in reading data into the corresponding buffer, or when the buffer is full.

PCL_SMODE: This field is updated by CDRTOS with the value contained in the submode byte of the subheader of the last sector read into this PCL.

PCL_TYPE: This field is set by the CDRTOS and contains the coding information byte of the subheader of the last sector read into the buffer of this PCL. This field can be used by the application module for reference only.

PCL_SIG: This field is initialised by the application module and contains a signal number to be returned to the application module when the buffer of the PCL is full or an error has been detected in the data transferred to the buffer.

PCL_NXT: This is a pointer to a further PCL item. A linked list of PCLs can be built by the application, but need only contain one item. The list may be circular or may be terminated by the entry of a null pointer in this field. The list of PCL's may be manipulated by the application module at any time during the execution of the Play.

PCL_BUF: This is a pointer to the buffer space in which the data from the disc is to be stored. It is the responsibility of the application module to make sure that this points to an allocated data area large enough to hold all the data requested for this PCL. If this pointer is zero, the data is not transferred into memory and PCL_CNT (see below) is not incremented.

PCL_BUFSZ: This field specifies the size, in sectors, of the buffer pointed to by PCL_BUF. This field is initialized by the application, and may be changed by the application at any time during the execution of the play command. A sector, as read from the disc, contains up to 2324 bytes of data (CD-ROM Mode 2, Form 2).

PCL_ERR: This field points to an error information structure. If this field contains a zero (No error information structure available) a "Data error" bit is set in PCL-CTRL, otherwise information about the data in error is also returned in the given buffers. These data can be used to conceal error in video sectors for instance.

PCL_CNT: This field contains the offset in bytes into the buffer of the next position to copy data. It should be initialized to zero by the application before the start of a play command. This field is updated by the system, but it may be changed by the application at any time during the execution of the play command.

Returning to the example of FIG. 3, then, the CIL(VIDEO) 306 points to a first PCL item 308 which in turn points to a buffer reserved for video data IM.1. The buffer conventionally will contain enough space for serveral tens of disc sectors; enough for one complete image, for example. This first PCL item in turn points (by field PCL_NXT) to a second PCL item, which describes the buffer area for data IM.2, perhaps a second image. The second PCL points to a third PCL describing the buffer for data IM.3. The third PCL points back to the first PCL 308, thereby defining a continuously repeating series of three images.

The CIL(AUDIO) 310 points to a list of two PCLs, describing the buffers for data AUD.1 an AUD.2 respectively. The second of these audio PCLs contains a null pointer '0' in the field PCL_NXT, indicating no further sound data to be played. As mentioned above, the application module can halt or modify the playback by altering various fields in the play control structure.

Now, in the course of the interactive operation of the player under control of the application module and the user, buffers of different sizes are allocated and released many times. This leads to the problem of memory fragmentation which can be seen in the status of the memory as illustrated in FIG. 3. The unallocated areas (cross-hatched) are small and scattered between the allocated blocks. This means that a request to the CDRTOS memory manager 200 for a new allocation of a large buffer space cannot be satisfied, even though the total amount of unallocated memory may be sufficient.

The memory fragmentation problem can now be addressed by operation of a Fragmented Memory Manager module 212 (FRAGM), shown in FIG. 2. FRAGM 212 actually partitions the memory into uniform and small buffers ("fragments") and maintains a linked listing of all unallocated fragments to allow dynamic allocation of any total buffer size, regardless of the physical addresses of the individual fragments in the memory 200. By making the links via PCL-like structures, in this CD-I embodiment, the fragmentation becomes effectively transparent to the play control module 208 of CDRTOS.

Figure 4:
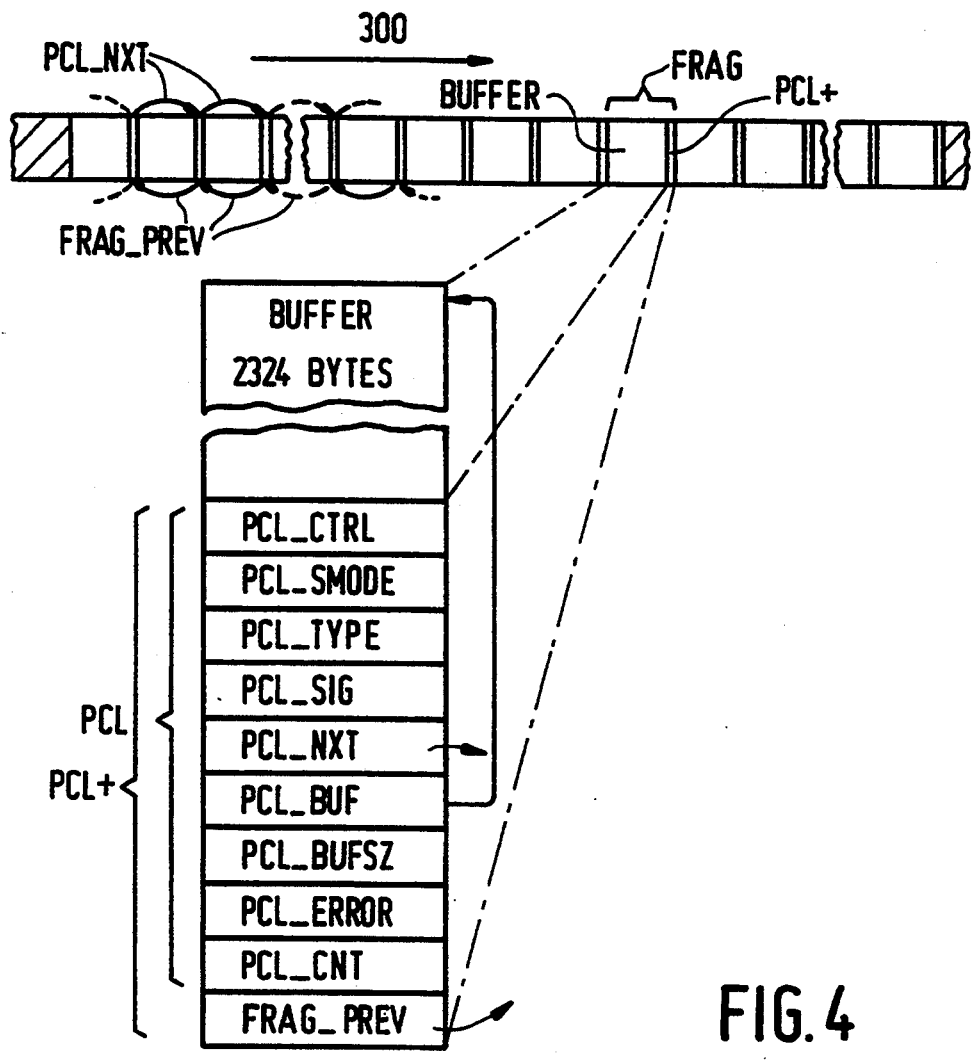
FIG. 4 illustrates the partitioning of the memory into small fragments in the apparatus of FIGS. 1 and 2, and shows the structure of one representative fragment.

As shown in FIG. 4, a large area of memory is divided into data structures "FRAG". Each FRAG comprises a buffer large enough for one disc data sector (2324 bytes), followed by an augmented PCL structure (PCL+). The various fields of the PCL structure are provided, with the meanings as described above. This is augmented however by an additional pointer field FRAG_PREV.

Figure 5:
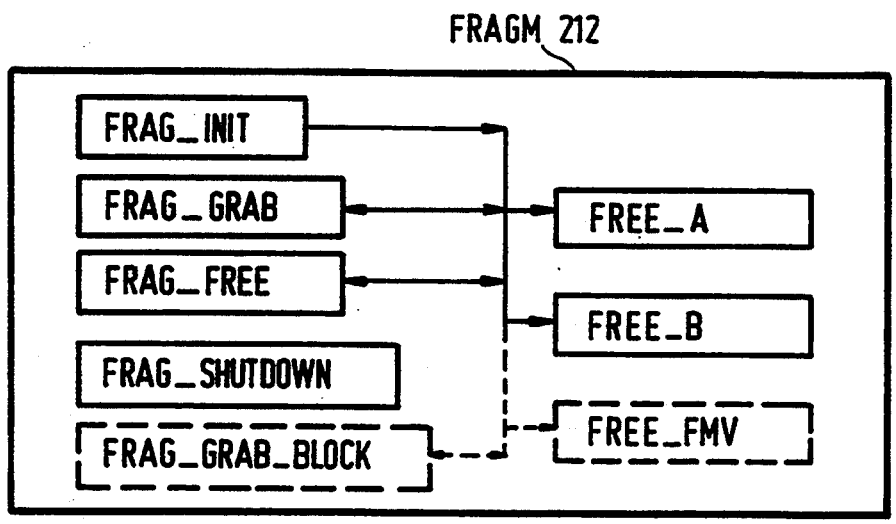
FIG. 5 shows the logical structure of a fragmented memory manager module in the apparatus.

FIG. 5 shows the logical structure of the fragmented memory manager module 212 (FRAGM) which includes functions FRAG_INT, FRAG-GRAB, FRAG_FREE and FRAG_SHUTDOWN. These are activated by the application module 202, for example by respective software function calls. For each plane of memory (A,B, FMV, etc) FRAGM maintains a pointer variable FREE-A, FREE-B, etc. For the purpose of simplicity, the following description makes no distinction between planes, except as explicitly mentioned.

The operation of the various modules 202-212 in accordance with the invention will now be described with reference to the flow charts of FIGS. 6 and 7. To assist in an understanding of their operation, FIG. 8 shows the status of memory allocation at four points (A),(B),(C) and (D) in the operation, as marked with circled letters in FIG. 6. It should be appreciated that while there are only shown twelve memory fragments, in practice hundreds of fragments can be allocated in the memory, each fragment giving 2324 bytes of buffer storage.

In FIG. 6, the application module begins operation at 700 when, for example, the user inserts a disc and a CD-I application program is automatically read from the disc and executed. The application program resides in one or other of the planes of the memory 200, but the bulk of memory remains unallocated, to be used for video and audio data.

Rather than request allocation of buffer memory from the CDRTIS memory manager 210 in the conventional manner, as and when buffers are required, the application module first finds at 702 the maximum amount of memory it will require in each plane. This will normally be calculated at the time of writing the application stored as part of the program. At 704, this maximum size, expressed as a number MAXN of sectors, is passed as a parameter to FRAGM, the fragmented memory manager module 212, in a call to the function FRAG_INIT. For each plane, the operation FRAG_INIT is shown in FIG. 7 as follows.

800: FRAG_INIT is activated by the application, in respect of a specific memory plane (A, B, FMV etc.).

802: The parameter MAXN specifies how many sectors of buffer space might be required by the application at any one time.

804: FRAGM requests CDRTOS memory manager 210 to allocate at once the memory space required for MAXN fragments.

806: Assuming such memory space is available, the address of the allocated space is received from the CDRTOS memory manager 210.

808: The allocated space is "formatted" to create a linked list of empty FRAG structures, each containing a buffer of 2324 bytes and an augmented PCL structure. This format is shown at (A) in FIG. 8, with MAXN=12 leading to just twelve FRAG structures. The free buffer areas of these fragments are marked F1 to F12 in FIG. 8(A).

FRAGM creates a pointer variable 900 (FREE) for the plane, which pointer contains the address of the start of the PCL structure of the first free fragment F1. The pointer PCL_NXT of each fragment is then set to point to the PCL of the next free fragment in turn, until all fragments have been linked. The last free fragment F12 has a null pointer '0' in its field PCL_NXT. The extra field FRAG_PREV is used to link every free fragment in the reverse order (F12 to F1). In each part of FIG. 8, the pointers PCL_NXT are represented by arrows above the fragments, while the reverse pointers FRAG_PREV are represented by arrows below the fragments.

810: Control returns to the application module, which makes no direct calls to the CDRTOS memory manager 210 thereafter.

The operation of the application module continues until a point where it is desired to play (for example) a real-time file containing four sectors of image data. At 706 the application module calls function FRAG_GRAB of the fragmented memory manager FRAGM, passing the number of sector buffers required as a parameter NSECT=4. FRAGM allocates the first four free fragments F1 to F4 simply by manipulation of the pointers as follows, in accordance with the steps 820-830 (FIG. 7):

820: FRAG_GRAB is called by the application module.

822: Parameter NSECT is received specifying the number of sectors of buffer space required.

824: The value of pointer FREE which presently indicates the address of the first free fragment F1 is copied to variable POINTER.

826: The linking pointers PCL_NXT are followed and counted up to NSECT to identify the fifth free fragment, and the FREE pointer is updated to indicate this fragment as the first free fragment. Thus the four allocated fragments F1 to F4 are unlinked from the free list and fragments F5 to F12 now become F1 to F8. Null pointers are written accordingly to complete the unlinking. Upon return to the application module, the variable POINTER can be used to address a list of four fragments, containing the requested four sectors of buffer space.

At 708, the variable POINTER is copied to a CIL entry CIL(IM1) as part of a Play Control Structure being defined by the application module. A Play Control Block (PCB) contains a pointer to the CIL for video, and another for audio, as described above in relation to the conventional memory management operations of CDRTOS. The situation of FIG. 8(B) now applies, with the four allocated sectors of buffer space being labelled IM1.1 to IM1.4.

At 710 the application module activates the play control module 208 of CDRTOS, passing to it the location of the PCB and identification of the disc location of four sectors of image data to be displayed. The play control module begins to read the identified sectors from the disc, and by means of the pointer CIL(IM1) locates the first PCL item. This in turn points to the buffer space IM1.1 which has been allocated to receive the data.

After reading the first sector of the image file, of course, the play control module finds the buffer IM1.1 full. Automatically it looks to the field PCL_NXT to find a pointer to a further PCL, which in turn points to further buffer space IM1.2. By this process, all four sectors of the image file are eventually loaded into the buffer sectors IM1.1 to IM1.4. As described in the Philips/Kluwer textbook, the video decoder of the CD-I player can be configured by means of entries in a Line Control Table to decode data from any memory location in order to generate a given line of displayed image. The application module needs in any case to set up the LCT to account for the location of the image buffer, and this can now be done to account for the location of each data segment in its respective fragment. Depending on the image coding employed, each sector can define only a few lines of a full screen image, so that in a practical embodiment, some tens of sectors are likely to be used for one image file.

Now, for the sample state of the memory reached so far at point (B) in the flow chart of FIG. 6, the partitioning of memory and formatting with regular PCL+structures might appear to cause excessive complication compared with the conventional memory management operations. However, as more and more files are read an discarded or kept after playing, the problem of memory fragmentation which besets conventional systems will never materialise.

Consider the situation at point (C) in FIGS. 6 and 8, after many real-time files have been played and discarded. At this point, four sectors F1 to F4 are presently in the free list, but they are dispersed widely throughout the block of twelve fragments. Three of the other fragments are occupied by dispersed sectors AU1.1 to AU1.3 of an audio data file. A CIL entry CIL(AU1) points to the PCL of the first of these fragments. The remaining five sectors are similarly dispersed and a video CIL entry CIL(IM2) points to the PCL of the first of these fragments, whose buffer area contains the first of five image data sectors IM2.1 to IM2.5.

At 712, the application module determines that it no longer requires the image data sectors IM2.1 to IM2.5, and calls the function FRAG_FREE of the fragmented memory manager, passing as a parameter POINTER the address of the PCL of the first fragment of the list of five fragments to be de-allocated. The operation of FRAG_FREE is illustrated by steps 840–850 of FIG. 7.

840: FRAG_FREE is activated by the application module.

842: FRAG_FREE receives the value POINTER which addresses the PCL of the first fragment to be released. In the example this is a pointer to the fragment containing buffer sector IM2.1.

844: The indicated fragment is re-formatted, in particular restoring the blank PCL+structure, in a manner similar to that of step 808 in FRAG_INIT. The values of PCL_NXT and FRAG_PREV are preserved, however, because what matters now is not the physical address of the fragments, but their position in the linked list.

846: If PCL_NXT is a null pointer, then this is the last of the fragments to be freed. If not, the value POINTER is updated to the value of PCL_NXT and control returns to step 844 where the next fragment is reformatted, and so on.

848: Eventually the null pointer has been found in field PCL_NXT. The re-formatted fragments are de-allocated by unlinking them into the free list. This is most simply achieved by changing the pointer FREE to indicate the first of the released fragments (IM2.1), changing PCL_NXT of the last released fragment (IM2.5), and changing FRAG_PREV of what was the first free fragment (F1) to indicate the last released fragment (IM2.5).

850: Control returns to the application module, at which the point the memory situation is as shown (D) in FIG. 8.

It can be seen from FIG. 8 that now there are nine free fragments F1 to F9 linked in a list, and three fragments still allocated to provide the buffers AU1.1 to AU1.3. Compared with the situation at (C), buffers IM2.1 to IM2.5 have become the first five free buffers F1 to F5 respectively, while what were the free buffers F1 to F4 have become free buffers F6 to F9 respectively.

Finally, at 714 the application module is preparing to cease its operation, and wishes to release the memory allocated to it via FRAGM. This is done by a call to function FRAG_SHUIDOWN of FRAGM with no parameters necessary, illustrated by flowchart steps 860–864.

860: FRAG_SHUTDOWN is activated.

862: The memory that was allocated by the CDRTOS memory manager 210 in each plane is release by a further activation of the CDRTOS memory manager. This memory now becomes free for use by the operating system, by other application modules or whatever.

864: Control returns to the application module.

At 716, the application module ceases operation and returns control of the CD-I player to the operating system (CDRTOS).

From the above example, the person skilled in the art will appreciate that the formatting of memory into a linked list of small fragments allows the use of all available memory for real-time buffers, even if such memory is severely fragmented and dispersed at random throughout the physical memory space. Referring to point (C) in the example, four sector buffers F1 to F4 were free for use, but separated from one another in physical location. By conventional memory management, an application module requesting more than one sector of buffer space would have had its request denied, at least until an extensive "garbage collection" operation could be carried out to bring all the free space into a large enough block. Thus by use of the invention, the chief problem associated with memory fragmentation has been avoided.

Note that an application module can free any subset of the fragments allocated to it by setting the pointer PCL_NXT to null for the last fragment to be released. FRAG_13 FREE will then release the fragment(s) addressed by the value POINTER only until it finds the fragment with PCL_NXT set to null. Of course the application module is responsible for properly maintaining a pointer to the fragments which remain allocated to it.

Although the reverse pointer FRAG_PREV has not yet been used in the example, it can be useful to the fragmented memory manager for housekeeping operations and special functions. Note in particular that use of FRAG need not prevent the allocation o a contiguous block of memory greater than one sector if such really is required. For example, some speed-critical program data, or data arrays may not be suitable for storage in fragments.

In the situation at (D) for example, there is actually a free contiguous area of six fragments in memory, even though no more than two fragments which are contiguous in memory are also adjacent at any point in the free list (F2/F3 and F4/F5). By following the linking pointers PCL_NXT and FRAG_PREV, FRAGM can readily identify contiguous blocks or memory. By manipulation of the pointers, FRAGM can then "stitch" these together so that they are also contiguous in the free fragment list. An application module can then specify when activating FRAG_GRAB that a contiguous block of size NSECT sectors is required.

FIG. 9 illustrates the allocation of a contiguous block of six fragments in stages (E) and (F). A separate function FRAG_GRAB_BLOCK might be defined for this purpose. At (E) the free list includes nine fragments F1 to F9, of which F1 to F8 are contiguous in physical memory. This may happen by chance, or because FRAGM has re-organised the free list in response to the request for a contiguous block.

At (F) in FIG. 9, the application module receives a value POINTER to an augmented PCL structure. This is identical to that for a normal fragment, except that PCL_BUFSZ indicates a buffer size of six sectors, and the pointer PCL_BUF points to the beginning of a large block buffer space which has been allocated for use by the application module. This space is the combination of fragments F1 to F6 of (E). Fragments F7 to F9 have now become the fragments F1 to F3 of the free list.

When the application module releases the allocated block, FRAGM simply re-formats it as if it were newly allocated by CDRTOS (c.f. step 808), and then links it back into the free list to restore the situation to that shown at (E).

Of course, allocating contiguous blocks excessively does defeat the purpose of the fragmented memory manager, and can lead to fragmentation problems. An application module should therefore request a contiguous block larger than one fragment only when strictly necessary, for example when loading executable program data.

Many other variations of the above embodiments are possible within the scope of the present invention. Note for example that the augmented PCL could be located before the buffer of the respective fragment rather than after it, if desired. In principle the augmented PCLs of the fragmented memory could even be gathered together in physical memory, leaving the sector buffers contiguous in memory. The arrangement shown is preferred, for example because memory is occupied by PCLs only to the extent that fragments are allocated and formatted as such.

Note that FRAGM is readily adapted to cope with any number of memory planes. An application module can then request a number of fragments to be allocated either from a specific plane, or with no preference as to which plane is used. In the CD-I player, for example, audio data and program data can be stored in either plane. The application module can improve memory efficiency by allowing the fragmented memory manager to choose to allocate fragments in whichever plane has most free memory, even to supply a fragment list including fragments from more different planes.

Of course the fragments could include larger buffers of two or three sectors in size, if this would bring efficiency in operation. The skilled reader will immediately appreciate that a larger minimum fragment size will result in some wastage of space because many buffers will be only partially used.

Within the CD-I player, almost any type of data can be stored in fragments, not just image and audio data. Font definitions, program data, compressed image data, text files and so forth can all be stored in fragmented memory. It will be apparent therefore that the applicability of the invention is not limited to playing real-time files in the CD-I player merely because the play control module of CDRTOS already includes features useful in the implementation of fragmented memory management. Such features could be implemented in hardware or software in any data processing system.

From reading the present disclosure, yet further modifications will be apparent to persons skilled in the art. Such modifications may involve other features which are already known in the design, manufacture and use of real-time data processing systems, memory management systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A player for a compact disc comprising:

a reader for receiving, from the disc, data for processing in real-time;

a decoder for processing the data received from the disc;

memory means coupled between the reader and the decoder for providing buffer space for storing the received data prior to processing by the decoder;

an application module for generating play commands to control the reader and decoder to process data in a desired sequence; and a play control module for receiving said play commands and for controlling the reader and decoder in real time so as to receive from the disc and cause processing of the data in the desired sequence defined by said play commands, wherein each of said play commands supplied to the play control module includes (i) file information defining the location on the disc of the data to be processed and (ii) buffer information specifying the location in the memory of buffer space for storing said data, wherein the buffer information comprises at least one play control item containing fields for indicating the location of a first quantity of buffer space and a list pointer to an optional further play control item, the play control module is responsive to said play commands to cause the data defined by the file information to be received from the disc and stored in said first quantity of buffer space and, in the event that said first quantity of buffer space becomes full, to use the list pointer to identify a further play control item indicating a further quantity of buffer space for storage of the required data, and the total available buffer space in the memory is divided into a plurality of fragments, each fragment containing a relatively small predetermined quantity of available buffer space and having an associated play control item with a list pointer identifying a further fragment containing available buffer space, the apparatus further comprises a fragmented memory manager module for maintaining, by means of the play control item list pointers, a list of those of said fragments whose buffer space is not currently in use by the play control module (the "free list") and responding to each request for allocation of buffer space by un-linking a list of fragments (the "allocated list") from the free list and supplying, to the application module, a pointer to the allocated list for use by the play control module in identifying buffer fragments for received data.

2. An apparatus as claimed in claim 1 wherein the reader comprises a CD-ROM drive and wherein the buffer space of one fragment is sufficient for one CD-ROM data sector.

3. The player of claim 1 wherein the disc is formatted according to the CD-I standard.

* * * * *